(12) United States Patent
Shastry et al.

(10) Patent No.: US 11,763,051 B2
(45) Date of Patent: Sep. 19, 2023

(54) STATE DEPENDENT AND PATH DEPENDENT POWER ESTIMATION

(71) Applicant: Siemens Industry Software Inc., Plano, TX (US)

(72) Inventors: Gopi Shastry, Pleasanton, CA (US); Amit Singh Yadav, San Jose, CA (US); Neeraj Joshi, Fremont, CA (US)

(73) Assignee: Siemens Industry Software Inc., Plano, TX (US)

( * ) Notice: Subject to any disclaimer, the term of this patent is extended or adjusted under 35 U.S.C. 154(b) by 198 days.

(21) Appl. No.: 17/461,665

(22) Filed: Aug. 30, 2021

(65) Prior Publication Data

US 2023/0063107 A1 Mar. 2, 2023

(51) Int. Cl.

| | |
|---|---|
| *G06F 30/33* | (2020.01) |
| *G06F 30/3308* | (2020.01) |
| *G06F 30/327* | (2020.01) |
| *G06F 30/398* | (2020.01) |
| *G06F 30/367* | (2020.01) |
| *G01R 21/00* | (2006.01) |

(52) U.S. Cl.
CPC .......... *G06F 30/33* (2020.01); *G01R 21/001* (2013.01); *G06F 30/327* (2020.01); *G06F 30/3308* (2020.01); *G06F 30/367* (2020.01); *G06F 30/398* (2020.01)

(58) Field of Classification Search
CPC .... G06F 30/33; G06F 30/3308; G06F 30/327; G06F 30/367; G06F 30/373; G06F 30/398; G01R 21/001

USPC ...................... 716/109, 111, 133; 703/15, 18
See application file for complete search history.

(56) References Cited

U.S. PATENT DOCUMENTS

| | | | | |
|---|---|---|---|---|
| 3,736,589 | A * | 5/1973 | Rambo | H03K 4/92 342/204 |
| 2006/0136793 | A1 * | 6/2006 | Wang | G06F 30/33 716/109 |
| 2016/0063161 | A1 * | 3/2016 | Kwok | G01R 31/00 716/106 |
| 2016/0224714 | A1 * | 8/2016 | Bencivenga | G06F 30/3323 |
| 2016/0246913 | A1 * | 8/2016 | Verma | G06F 8/41 |
| 2016/0357834 | A1 * | 12/2016 | May | G06F 30/398 |
| 2017/0338746 | A1 * | 11/2017 | Chen | H02M 3/33507 |
| 2018/0218092 | A1 * | 8/2018 | Dwivedi | G06F 30/398 |
| 2018/0225394 | A1 * | 8/2018 | Verma | G06F 30/33 |
| 2018/0225400 | A1 * | 8/2018 | Khare | G06F 30/3312 |
| 2019/0171539 | A1 * | 6/2019 | Pillay | G06F 30/15 |

(Continued)

*Primary Examiner* — Phallaka Kik

(57) ABSTRACT

This application discloses a computing system implementing a power estimator can read in waveform data generated during functional verification of a circuit design describing an electronic device, detect toggles in the signals of the waveform data, correlate the detected toggles in the signals to arcs associated with logic gates in the circuit design, and track a number of times each of the arcs has been correlated to the detected toggles. After the waveform data has been read, the power estimator can look-up power values for each arc having been correlated to a detected signal toggle, multiple the power values by the tracked number of times each of the arcs been correlated to the detected toggles to compute power estimates, and generate an estimate of power consumption for the circuit design during the functional verification by accumulating the power estimates for the arcs associated with the logic gates.

20 Claims, 5 Drawing Sheets

(56) References Cited

U.S. PATENT DOCUMENTS

2022/0343044 A1* 10/2022 Jain .................... G06F 30/367
2023/0048929 A1*  2/2023 Jain .................... G06F 30/3308

* cited by examiner ic design automation and, more specifically, to state dependent and path dependent power estimation.

STATE DEPENDENT AND PATH DEPENDENT POWER ESTIMATION

TECHNICAL FIELD

This application is generally related to electronic design automation and, more specifically, to state dependent and path dependent power estimation.

BACKGROUND

Designing and fabricating electronic systems typically involves many steps, known as a "design flow." The particular steps of a design flow often are dependent upon the type of electronic system to be manufactured, its complexity, the design team, and the fabricator or foundry that will manufacture the electronic system from a design. Initially, a specification for a new electronic system can be transformed into a logical design, sometimes referred to as a register transfer level (RTL) description of the electronic system. With this logical design, the electronic system can be described in terms of both the exchange of signals between hardware registers and the logical operations that can be performed on those signals. The logical design typically employs a Hardware Design Language (HDL), such as System Verilog or Very high speed integrated circuit Hardware Design Language (VHDL).

The logic of the electronic system can be analyzed to confirm that it will accurately perform the functions desired for the electronic system, sometimes referred to as "functional verification." Design verification tools can perform functional verification operations, such as simulating, emulating, and/or formally verifying the logical design. For example, when a design verification tool emulates the logical design, the design verification tool can provide transactions or sets of test vectors, for example, generated by an emulated test bench, to the emulated logical design. The design verification tools can determine how the emulated logical design responded to the transactions or test vectors, and verify, from that response, that the logical design describes circuitry to accurately perform functions.

The logical design of the electronic system can be undergo other forms of analysis, such as power estimation, which can analyze waveform data generated during simulation or emulation to estimate power consumption by the electronic system described by the logical design. One type of power estimation is state dependent path dependent-based power consumption estimation, which can include a determination of dynamic power utilization by different paths through logic gates of the logical design while the logic gates have different states, often referred to as arcs.

Due to limitations of memory storage capacity, electronic design automation tools usually perform dynamic power estimation one library cell at a time, for example, loading internal power information, such as pin-pin arc specifications, from a library cell description, reading the waveform data with a signal-based iterator to identify signals of logical gates corresponding to the loaded library cell information, identifying when the state dependent and path dependent conditions trigger an arc, and then perform a table look-up of the internal power information to identify an estimate of the power consumption for the triggered arc using a capacitance and a slew of the logical gate. The electronic design automation tools can continue to identify the when the state dependent and path dependent conditions triggered different arcs for the library cell, perform different table look-ups based on which of the arcs were triggered, and accumulate the power consumption estimates found in the table look-ups to determine the total power consumption estimate for the library cell before repeating the process with each library cell in the logical design. While this procedure to determine dynamic power consumption can accurately provide power estimation for the logical design, due to the time it takes to perform the power estimation look-ups, it often can be impractical for many logical designs and thus has been limited to certain types of memory cells having larger variance in power. Further, certain design verification environments have functional verification engines that generate waveform data that cannot be read with signal-based iterators, thus removing the ability to determine dynamic power utilization one library cell at a time.

SUMMARY

This application discloses a computing system implementing a power estimator can read in waveform data generated during functional verification of a circuit design describing an electronic device, detect toggles in the signals of the waveform data, correlate the detected toggles in the signals to arcs associated with logic gates in the circuit design, and track a number of times each of the arcs has been correlated to the detected toggles. After the waveform data has been read, the power estimator can look-up power values for each arc having been correlated to a detected signal toggle, multiple the power values by the tracked number of times each of the arcs been correlated to the detected toggles to compute power estimates, and generate an estimate of power consumption for the circuit design during the functional verification by accumulating the power estimates for the arcs associated with the logic gates. Embodiments will be described below in greater detail.

DETAILED DESCRIPTION

Illustrative Operating Environment

Figure 1:
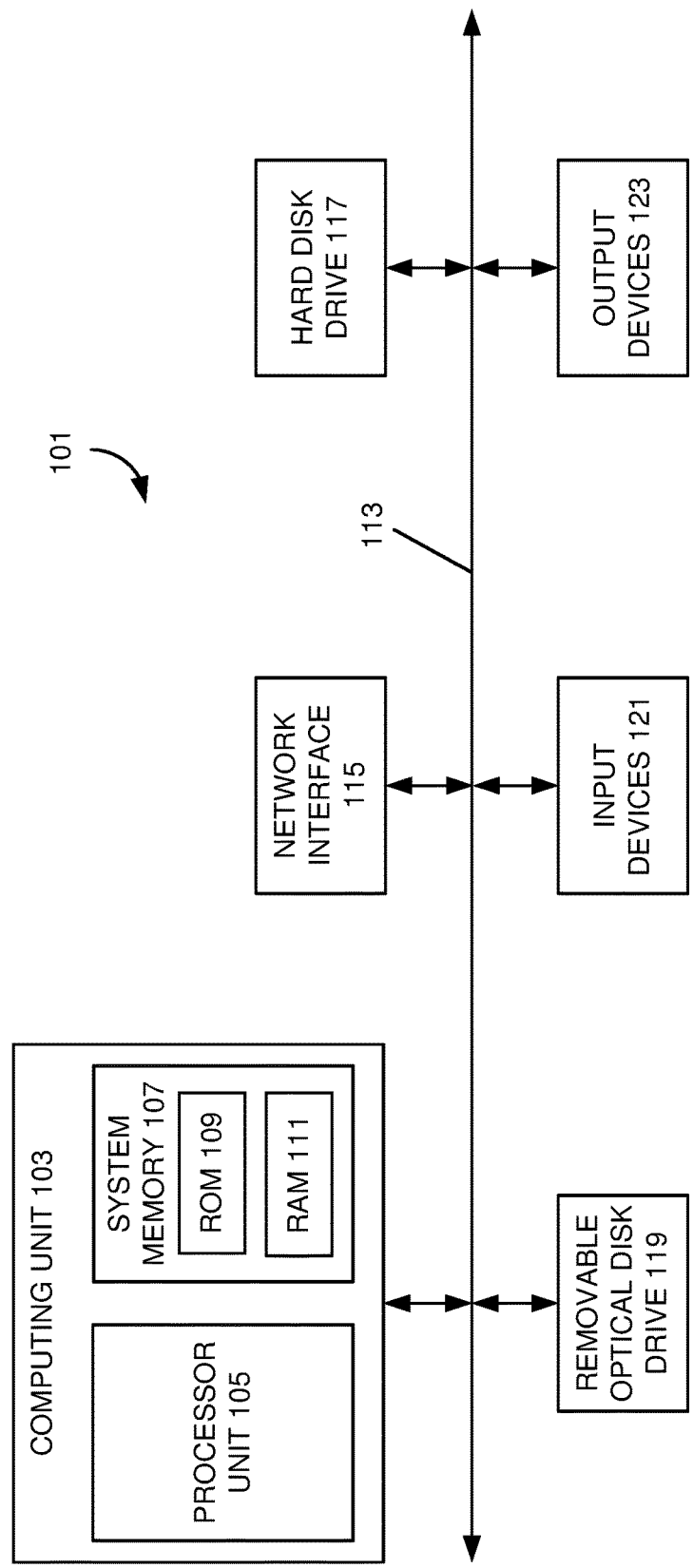
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
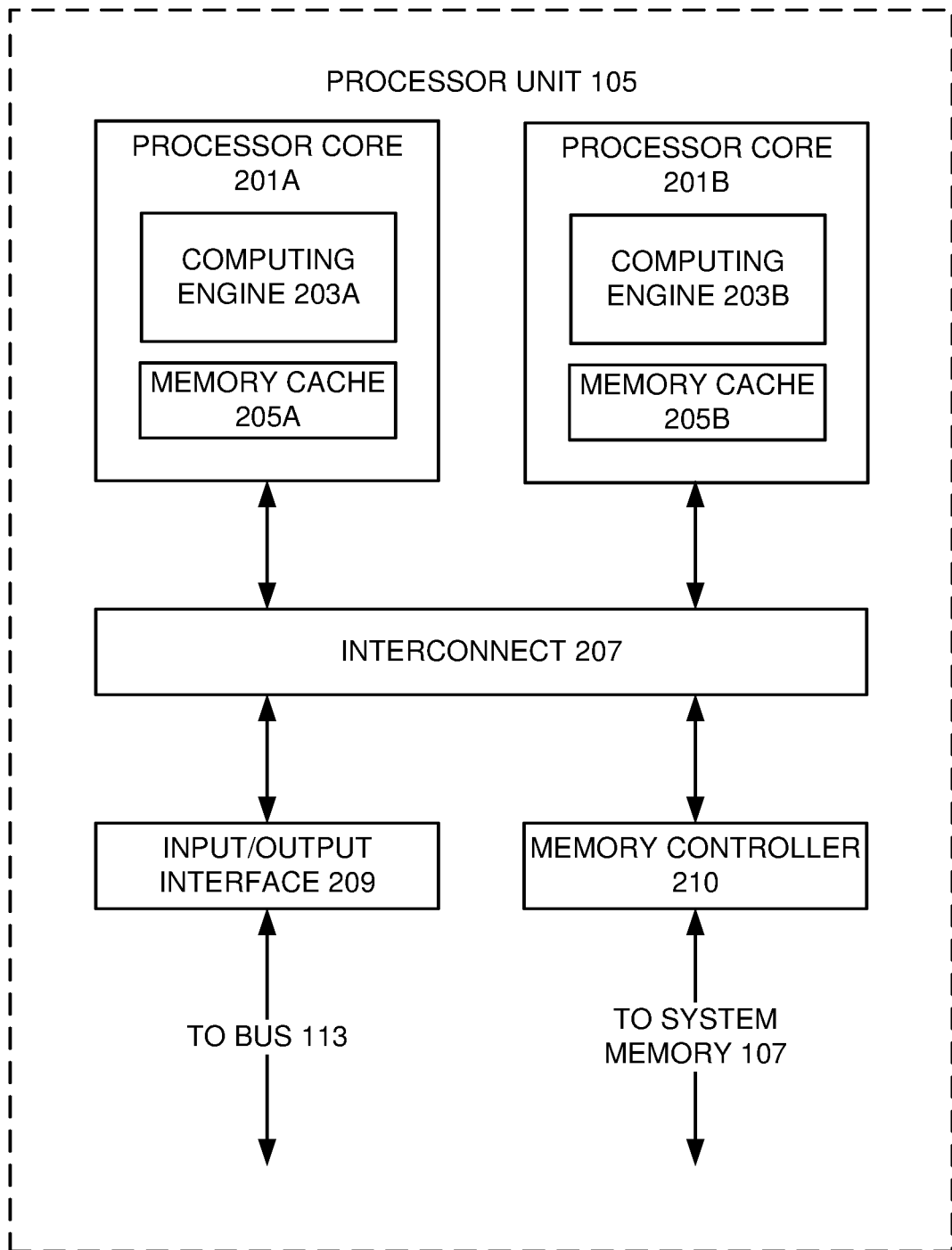

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

State Dependent and Path Dependent Power Estimation

Figure 3:
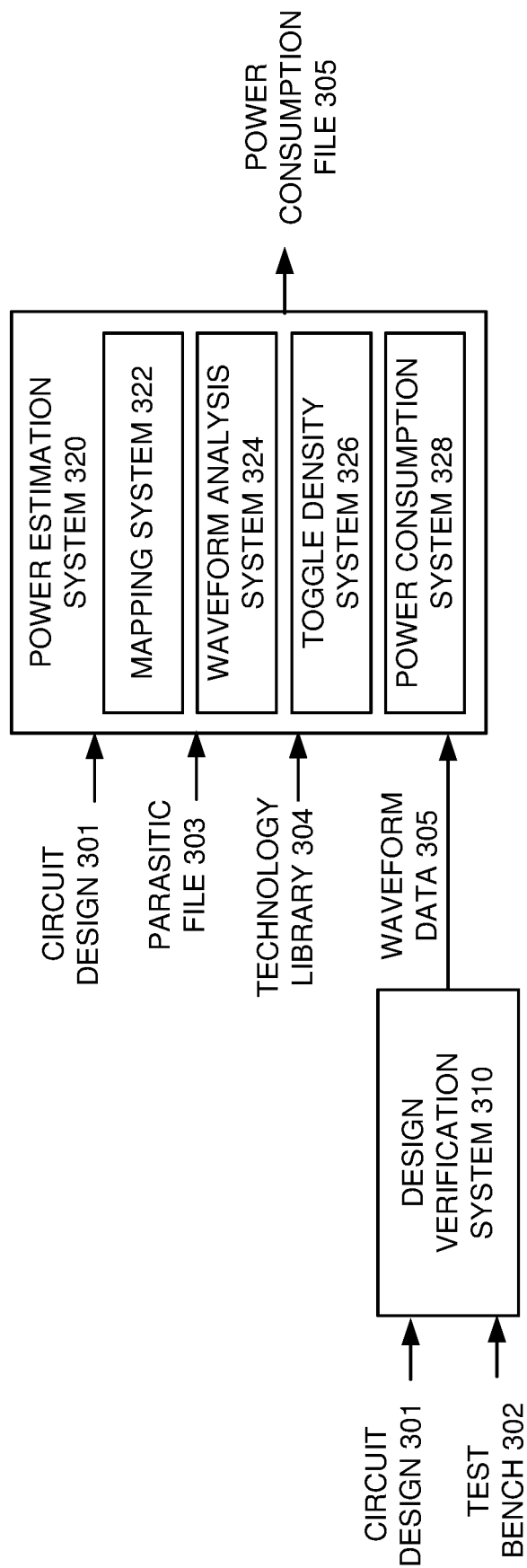
FIG. 3 illustrates an example power estimation system to perform state dependent and path dependent power estimation according to various embodiments.
Figure 4:
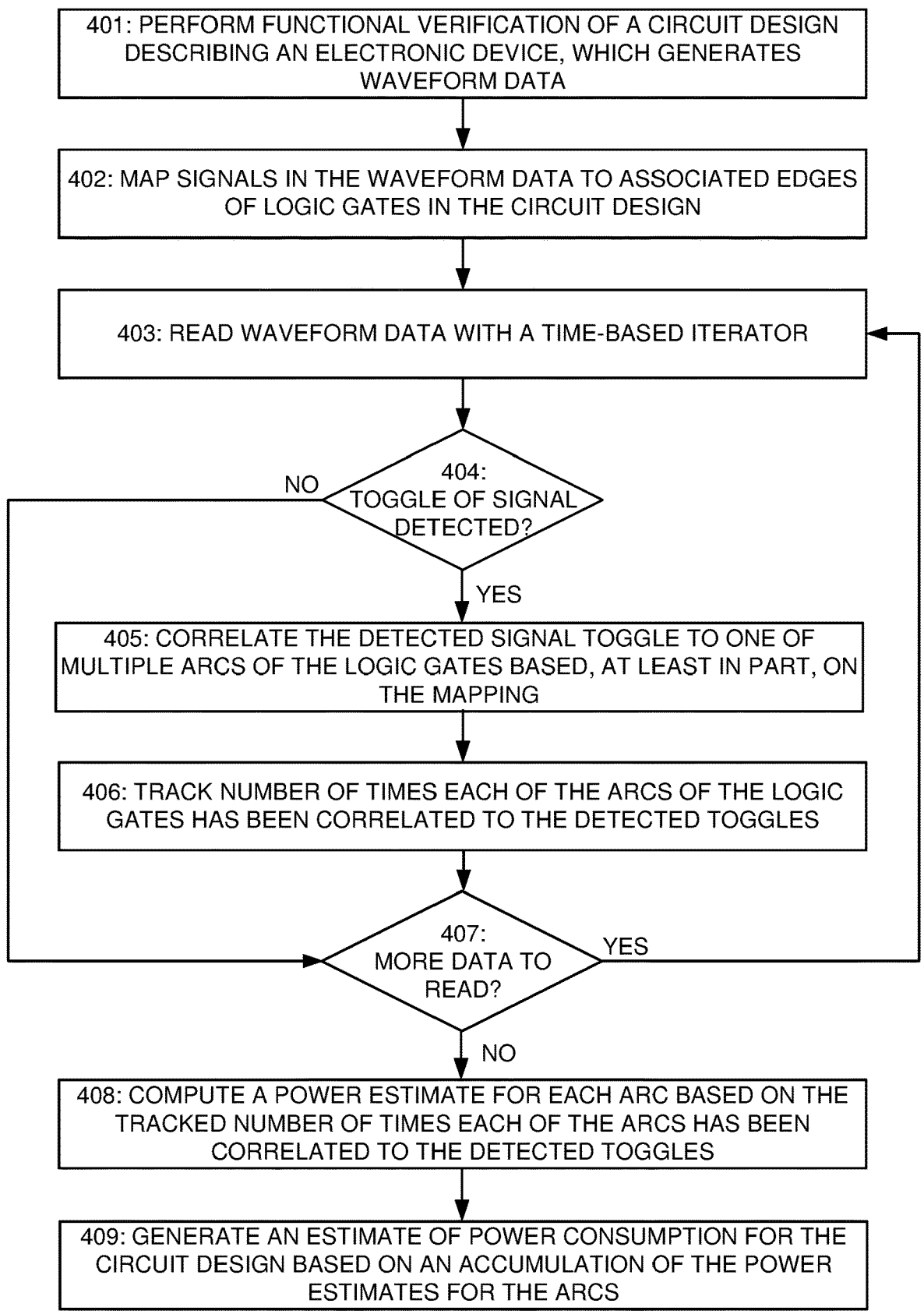
FIG. 4 illustrates a flowchart showing an example implementation of a state dependent and path dependent power estimation according to various embodiments.

FIG. 3 illustrates an example system including a design verification system 310 and a power estimation system 320 that may be implemented according to various embodiments. FIG. 4 illustrates a flowchart showing an example implementation of a consolidated state dependent and path dependent power estimation according to various embodiments. Referring to FIGS. 3 and 4, the design verification system 310, for example, implemented with a computer network 101 described above with reference to FIG. 1, can receive a circuit design 301 describing an electronic device. In some embodiments, the circuit design 301 can describe the electronic device both in terms of an exchange of data signals between components in the electronic device, such as hardware registers, flip-flops, combinational logic, or the like, and in terms of logical operations that can be performed on the data signals in the electronic device. The circuit design 301 can model the electronic device at a register transfer level (RTL), for example, with code in a hardware description language (HDL), such as SystemVerilog, Very high speed integrated circuit Hardware Design Language (VHDL), System C, or the like.

The design verification system 310, in a block 401 of FIG. 4, can perform functional verification of the circuit design 301 describing the electronic device. The design verification system 310 can utilize a test bench 302 to generate test stimulus during functional verification operations, such as clock signals, activation signals, power signals, control signals, data signals or the like. The test stimulus, when grouped, may form test bench transactions capable of prompting operation of the circuit design 301 being functionally verified by the design verification system 310. In some embodiments, the test bench 302 can be written in an object-oriented programming language, for example, SystemVerilog or the like, which, when executed during elaboration, can dynamically generate test bench components for verification of the circuit design. A methodology library, for example, a Universal Verification Methodology (UVM) library, an Open Verification Methodology (OVM) library, an Advanced Verification Methodology (AVM) library, a Verification Methodology Manual (VMM) library, or the like, can be utilized as a base for creating the test bench 302. The design verification system 310 can record output created during functional verification of the circuit design 301 with stimulus from the test bench 302, called waveform data 305.

The design verification system 310, for example, implemented with a computer network 101 described above with reference to FIG. 1, can receive the circuit design 301 describing the electronic device, a parasitic file 303, a technology library 304, and the waveform data 305 generated during functional verification of the circuit design 301 by the design verification system 310. In some embodiments, the circuit design 301 can be specified as a gate-level netlist, which can be a synthesized version of the circuit design 301 specified in the register transfer level (RTL) format. The gate-level netlist can describe logic gates and their interconnections or nets in the electronic device. In other embodiments, the design verification system 310 can include a synthesis engine, which can synthesize the RTL version of the circuit design 301 into the gate-level netlist.

The parasitic file 303 can describe or model the electronic device described in the circuit design 301 as a group of electrically-independent parasitic models, for example, in a Standard Parasitic Exchange Format (SPEF), or the like, generated by a parasitic extraction tool. The technology library 304, for example, specified in a Liberty format, can describe standard cells in terms of timing information, power estimation, area, functionality, operating conditions, or the like. In some embodiments, the technology library 304 can specify the internal power details for logic gates, for example, power estimates for different arcs associated with the logic gates. For example, the technology library 304 can include a power estimate table for each arc, which can be indexable by a combination of an input capacitance and a slew associated with the arcs of the logic gates. Each logic gate can have one or more different types of arcs, such an input-output (I/O) arc or a self arc. The I/O arc can correspond to a path between an input of the logic gate and an output of the logic gate, for example, activated when a change occurs on the output of the logic gate. The self arc also can correspond to a path between an input of the logic gate and an output of the logic gate, for example, activated when a change occurs on the input of the logic gate, while the output remains the same. Embodiments of the power estimation look-up table will be described below in greater detail with reference to FIG. 5.

Figure 5:
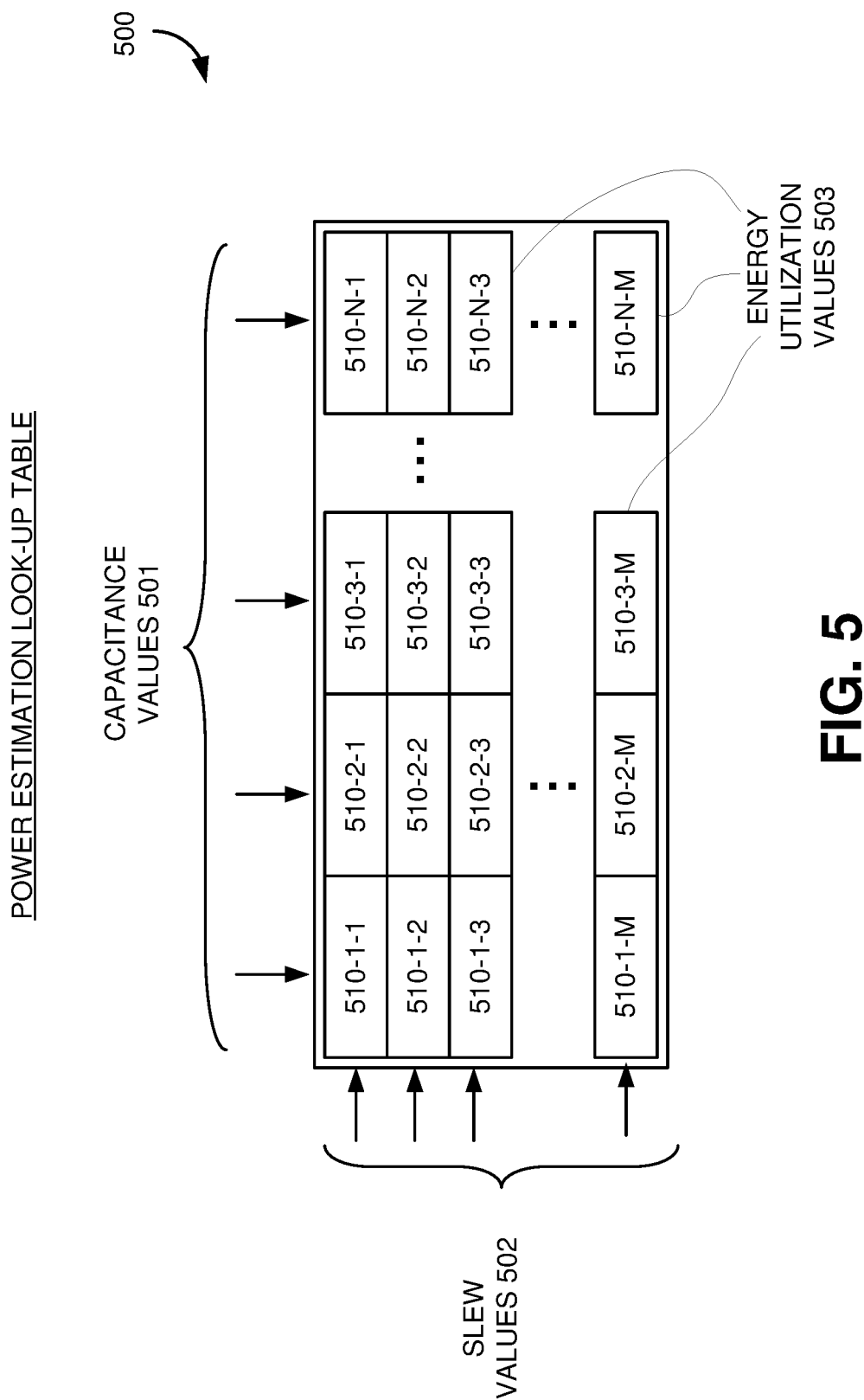
FIG. 5 illustrates an example power estimation look-up table utilized to implement state dependent and path dependent power estimation according to various embodiments.

FIG. 5 illustrates an example power estimation look-up table 500 utilized to implement state dependent and path dependent power estimation according to various embodiments. Referring to FIG. 5, the power estimation look-up table 500 can correspond to an arc of a logic gate described in a technology library, for example, specified in a Liberty format. The power estimation look-up table 500 can correspond to a two-dimensional array of possible energy utilization values 503 associated with dynamic power consumption for the arc of the logic gate under differing conditions. The columns of the power estimation look-up table 500 can correspond to different input capacitance value 501 loading the input of the logic gate associated with the arc. The rows of the power estimation look-up table 500 can correspond to different slew values 502 for the input of the logic gate associated with the arc. The combination of an input capacitance value 501 and a slew value 502 can identify one of the energy utilization values 503 in the power estimation look-up table 500.

Referring back to FIGS. 3 and 4, the power estimation system 320 can include a mapping system 322 that, in a block 402 of FIG. 4, can map signals in the waveform data 305 to associated edges of logic gates in the circuit design 301. The edges of the logic gates can correspond to the inputs and/or the outputs of the logic gates associated with the arcs utilized for path dependent and state dependent dynamic power estimate.

The power estimation system 320 can include a waveform analysis system 324 to read the waveform data 305. In some embodiments, the waveform analysis system 324, in a block 403 of FIG. 4, can implement a time-based iterator to read the waveform data 305 for signals corresponding to all logic gates. The time-based iterator can read the waveform data 305 according to the temporal performance of the functional verification as opposed to on a signal-by-signal basis, which allows the waveform analysis system 324 to read the waveform data 305 once for all signals, instead of once for each signal in the waveform data 305.

The waveform analysis system 324 can review the signals read from the waveform data 305 and, in a decision block 404, can detect when at least one of the signals in the waveform data 305 toggles or changes value. When, in the decision block 404, the waveform analysis system 324 detects a toggle of at least one of the signals read from the waveform data, execution can proceed to a block 405 of FIG. 4, where a toggle density system 326 of the power estimation system 320 can correlate the detected signal toggle to one of multiple arcs of the logic gates based, at least in part, on the mapping. The mapping of the signals to the edges can indicate to the toggle density system 326 when value changes in the signals correspond to activations of arcs associated with the logic gates. In some embodiments, the mapping can identify when a signal corresponds to an edge of a logic gate associated with an arc for the logic gate and the toggle density system 326 can determine which arc of the logic gate was activated based on the toggle of the signal.

Once the detected signal toggle has been correlated to the arc, rather than perform a conventional power estimation table look-up with corresponding input capacitance and slew value, the toggle density system 326, in a block 406 of FIG. 4, can track the number of times each of the arcs of the logic gates has been correlated to the detected toggles. In some embodiments, the toggle density system 326 can select a function call corresponding to the arc correlated to the detected signal toggle. The toggle density system 326 can implement the selected function call, which executes compiled code that can generate a shared object to track the number of times each of the arcs of the logic gates has been correlated to the detected toggles. The shared object, in some embodiments, can increment a counter associated with the corresponding arc each time the selected function call has been implemented. The toggle density system 326 can implement separate counters and/or otherwise retain tracked numbers for each arc in the circuit design 301, and the value of the counters or track numbers can correspond to the number of times the corresponding arcs were activated in the waveform data 305.

When, in the decision block 404, the waveform analysis system 324 does not detect a toggle of at least one of the signals read from the waveform data 305 or after the toggle density system 326 tracks the number of times each of the arcs of logic gates have been correlated in the block 406, execution can proceed to the block 407, where the waveform analysis system 324 can determine whether additional waveform data 305 remains to be read. When, in the decision block 407, the waveform analysis system 324 determines additional waveform data 305 remains to be read, execution can return to the block 403, where the waveform analysis system 324 can continue to read the waveform data 305 with the time-based iterator.

When, in the decision block 406, the waveform analysis system 324 determines no additional waveform data remains to be read, execution can proceed to the block 407, where a power consumption system 328 in the power estimation system 320 can compute a power estimate for each arc based on the tracked number of times each of the arcs has been correlated to the detected toggles. In some embodiments, the power consumption system 328 can perform a different power estimation table look-up for each of the arcs to identify energy utilization of each arc when activated, and then compute the power estimates for each of the arcs by multiplying the energy utilization during a single arc activation by a tracked number of times each of the arcs has been activated. By bifurcating the power estimation table look-up from the identification of when an arc became activated and by tracking a number of times the arc have been activated, the power consumption system 328 can reduce a number of power estimation table look-ups performed to compute the power estimates for each of the arcs, for example, allowing the power consumption system 328 to perform a single power estimation table look-up per arc instead of having to perform a power estimation table look-up for each arc activation.

The power consumption system 328, in a block 408, can generate an estimate of power consumption for the circuit design based on an accumulation of the power estimates for the signals. In some embodiments, the power consumption system 328 can add the power estimates for each of the arcs, which can correspond to a total dynamic energy estimate for the circuit design 301. The power consumption system 328 also can determine a total power estimate for the circuit design 301 by dividing the total dynamic energy estimate by the duration of the functional verification of the circuit design 301.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   detecting, by a computing system, toggles of signals in waveform data generated during functional verification of a circuit design describing an electronic device;
   correlating, by the computing system, the toggles in the signals of the waveform data to one of a plurality of arcs associated with the logic gates in the circuit design;
   tracking, by the computing system, a number of times each of the arcs associated with logic gates has been correlated to the detected toggles;
   determining, by the computing system, power estimates for each arc of the logic gates based, at least in part, on the tracked number of times each of the arcs associated with logic gates has been correlated to the detected toggles; and
   generating, by the computing system, an estimate of power consumption for the circuit design during the functional verification by accumulating the power estimates for the arcs associated with the logic gates.

2. The method of claim 1, wherein determining the power estimates for each arc of the logic gates further comprises:
   identifying an input capacitance to edges of the logic gates and slews corresponding to electrical transition times for each arc in the logic gates of the circuit design; and
   retrieving energy values for each arc from an energy table described in a technology file that is indexed with a combination of the input capacitances and the slews, wherein the power estimates for each arc of the logic gates are determined based on the energy values.

3. The method of claim 2, wherein determining the power estimates for each of the arc of the logic gates further comprises multiplying the retrieved energy values by the tracked number of times each of the arcs associated with logic gates has been correlated to the detected toggles.

4. The method of claim 1, further comprising reading, by the computing system, the waveform data for all of the logic gates with a time-based iterator.

5. The method of claim 1, wherein correlating the toggles in the signals of the waveform data to one of the arcs associated with the logic gates in the circuit design further comprises:
   mapping edges of the logic gates in the circuit design corresponding to at least one of the arcs to signals in the waveform data; and
   determining the detected toggles in the signals correlate to the edges of the logic gates in the circuit design corresponding to at least one of the arcs based on the mapping.

6. The method of claim 1, further comprising generating, by the computing system, compiled code that, when called in response to the toggles in the signals of the waveform data, is configured to dynamically generate shared objects that correlate the toggles in the signals of the waveform data to one of the arcs associated with the logic gates in the circuit design and track the number of times each of the arcs associated with logic gates has been correlated to the detected toggles.

7. The method of claim 1, further comprising performing the functional verification of the circuit design to generate the waveform data.

8. A system comprising:
   a memory system configured to store computer-executable instructions; and
   a computing system, in response to execution of the computer-executable instructions, is configured to:
      detect toggles of signals in waveform data generated during functional verification of a circuit design describing an electronic device;
      correlate the toggles in the signals of the waveform data to one of a plurality of arcs associated with the logic gates in the circuit design;
      track a number of times each of the arcs associated with logic gates has been correlated to the detected toggles;
      determine power estimates for each arc of the logic gates based, at least in part, on the tracked number of times each of the arcs associated with logic gates has been correlated to the detected toggles; and
      generate an estimate of power consumption for the circuit design during the functional verification by accumulating the power estimates for the arcs associated with the logic gates.

9. The system of claim 8, wherein the computing system, in response to execution of the computer-executable instructions, is further configured to determine the power estimates for each of the arc of the logic gates by:
   identifying an input capacitance to edges of the logic gates and slews corresponding to electrical transition times for each arc in the logic gates of the circuit design; and
   retrieving energy values for each arc from an energy table described in a technology file that is indexed with a combination of the input capacitances and the slews, wherein the power estimates for each arc of the logic gates are determined based on the energy values.

10. The system of claim 9, wherein the computing system, in response to execution of the computer-executable instructions, is further configured to determine the power estimates for each of the arc of the logic gates by multiplying the retrieved energy values by the tracked number of times each of the arcs associated with logic gates has been correlated to the detected toggles.

11. The system of claim 8, wherein the computing system, in response to execution of the computer-executable instructions, is further configured to read the waveform data for all of the logic gates with a time-based iterator.

12. The system of claim 8, wherein the computing system, in response to execution of the computer-executable instructions, is further configured to correlate the toggles in the signals of the waveform data to one of the arcs associated with the logic gates in the circuit design by:
   mapping edges of the logic gates in the circuit design corresponding to at least one of the arcs to signals in the waveform data; and
   determining the detected toggles in the signals correlate to the edges of the logic gates in the circuit design corresponding to at least one of the arcs based on the mapping.

13. The system of claim 8, wherein the computing system, in response to execution of the computer-executable instructions, is further configured to generate compiled code that, when called in response to the toggles in the signals of the waveform data, is configured to dynamically generate shared objects that correlate the toggles in the signals of the waveform data to one of the arcs associated with the logic gates in the circuit design and track the number of times each of the arcs associated with logic gates has been correlated to the detected toggles.

14. An apparatus comprising at least one computer-readable memory device storing instructions configured to cause one or more processing devices to perform operations comprising:

detecting toggles of signals in waveform data generated during functional verification of a circuit design describing an electronic device;

correlating the toggles in the signals of the waveform data to one of a plurality of arcs associated with the logic gates in the circuit design;

tracking a number of times each of the arcs associated with logic gates has been correlated to the detected toggles;

determining power estimates for each arc of the logic gates based, at least in part, on the tracked number of times each of the arcs associated with logic gates has been correlated to the detected toggles; and generating an estimate of power consumption for the circuit design during the functional verification by accumulating the power estimates for the arcs associated with the logic gates.

15. The apparatus of claim 14, wherein determining the power estimates for each arc of the logic gates further comprises:

identifying an input capacitance to edges of the logic gates and slews corresponding to electrical transition times for each arc in the logic gates of the circuit design; and retrieving energy values for each arc from an energy table described in a technology file that is indexed with a combination of the input capacitances and the slews, wherein the power estimates for each arc of the logic gates are determined based on the energy values.

16. The apparatus of claim 15, wherein determining the power estimates for each of the arc of the logic gates further comprises multiplying the retrieved energy values by the tracked number of times each of the arcs associated with logic gates has been correlated to the detected toggles.

17. The apparatus of claim 14, wherein the instructions are configured to cause the one or more processing devices to perform operations further comprising reading the waveform data for all of the logic gates with a time-based iterator.

18. The apparatus of claim 14, wherein correlating the toggles in the signals of the waveform data to one of the arcs associated with the logic gates in the circuit design further comprises:

mapping edges of the logic gates in the circuit design corresponding to at least one of the arcs to signals in the waveform data; and determining the detected toggles in the signals correlate to the edges of the logic gates in the circuit design corresponding to at least one of the arcs based on the mapping.

19. The apparatus of claim 14, wherein the instructions are configured to cause the one or more processing devices to perform operations further comprising generating compiled code that, when called in response to the toggles in the signals of the waveform data, is configured to dynamically generate shared objects that correlate the toggles in the signals of the waveform data to one of the arcs associated with the logic gates in the circuit design and track the number of times each of the arcs associated with logic gates has been correlated to the detected toggles.

20. The apparatus of claim 14, wherein the instructions are configured to cause the one or more processing devices to perform operations further comprising performing the functional verification of the circuit design to generate the waveform data.

\* \* \* \* \*